United States Patent [19]

Endo et al.

[11] Patent Number: 4,531,138

[45] Date of Patent: Jul. 23, 1985

[54] LIQUID JET RECORDING METHOD AND APPARATUS

[75] Inventors: Ichiro Endo, Yokohama; Shigetaro Ogura, Musashino; Shigeru Ohno, Yokohama, all of Japan

[73] Assignee: Canon Kabushiki Kaisha, Tokyo, Japan

[21] Appl. No.: 562,994

[22] Filed: Dec. 16, 1983

Related U.S. Application Data

[63] Continuation of Ser. No. 304,930, Sep. 23, 1981, abandoned.

[30] Foreign Application Priority Data

Oct. 2, 1980 [JP] Japan ............................... 55-138009

[51] Int. Cl.[3] ...................... G01D 15/18; G01D 15/10

[52] U.S. Cl. .............................. 346/140 R; 346/76 L

[58] Field of Search ............... 346/76 L, 140 PD, 160

[56] References Cited

U.S. PATENT DOCUMENTS

| | | | |
|---|---|---|---|
| 3,060,429 | 10/1962 | Winston | 345/1 |
| 3,090,828 | 5/1963 | Bain | 346/160 X |
| 3,298,030 | 1/1967 | Lewis et al. | 346/75 |
| 3,596,275 | 7/1971 | Sweet | 346/1 |
| 3,683,212 | 8/1972 | Zoltan | 310/8.3 |
| 3,747,120 | 7/1973 | Stemme | 346/75 |
| 3,946,398 | 3/1976 | Kyser et al. | 346/1 |
| 4,028,732 | 6/1977 | Salter et al. | 346/76 L |
| 4,243,994 | 1/1981 | Kobayashi et al. | 346/140 PD |

*Primary Examiner*—George H. Miller, Jr.
*Attorney, Agent, or Firm*—Fitzpatrick, Cella, Harper & Scinto

[57] ABSTRACT

A liquid jet recording method and apparatus for recording information on a recording medium. A laser beam is irradiated onto an opto-mechanical transducer provided at a position, in a liquid flow path having at its distal end a discharge orifice for ejecting liquid in a predetermined direction and a pressure acting zone, at which a pressure acts on the recording liquid filled in that portion of the flow path, where the pressure as generated is effectively transmitted to the recording liquid filled in the pressure acting zone. This enables the liquid to be ejected from the discharge orifice, by which laser beam irradiation mechanical displacement is caused to deform the wall of the pressure acting zone to thereby bring about abrupt pressure change in the liquid filled in the pressure acting zone to eject the liquid from the discharge orifice in the form of droplets which fly toward the surface of a recording medium, on which the droplets adhere to make a necessary recording.

13 Claims, 8 Drawing Figures

LIQUID JET RECORDING METHOD AND APPARATUS

This application is a continuation of application Ser. No. 304,930 filed Sept. 23, 1981, now abandoned.

BACKGROUND OF THE INVENTION

1. Field of the Invention

This invention relates to a liquid jet recording method. More particularly, it is concerned with a liquid jet recording method, wherein recording liquid is caused to fly in the form of droplets onto the surface of a recording medium for recording.

2. Description of Prior Arts

Non-impact recording method has drawn interest of all concerned because noise generation during the recording operation is at such a low level that it is negligible. Of various non-impact recording methods, the so-called "ink-jet recording method" (liquid jet recording method) capable of high speed recording and of performing recording on plain paper as a recording member without necessity for special fixing treatment is regarded as an extremely powerful and useful recording method. So far, various systems for this ink jet recording have been devised, some of which have already been commercialized after many improvements, and others of which are still under way for practical use even at present.

This ink jet recording method is to perform recording by causing droplets of recording liquid called 'ink' to fly toward the surface of a recording medium and to adhere on it for the recording. Depending on the method of producing the droplets and method of controlling the flying direction of the droplets as produced, the ink jet recording method is classified into several systems. Largely, however, the method can be classified into the following two systems: the one as disclosed in, for example, U.S. Pat. No. 3,060,429 3,596,275 3,298,030, etc.; and the other as disclosed in U.S. Pat. Nos. 3,683,212 3,747,120, 3,946,398, etc. While these conventional systems possess various characteristics, they still have inherent and fundamental problems to be solved.

In more detail, the first-mentioned system possesses the following problems: a high voltage is required for generation of droplets or stream of droplets; the flying direction of the droplets needs to be controlled under a high electric field; since the recording head is difficult to be constructed in a multi-orifice structure, particularly, a high density multi-orifice structure, the system is not suitable for high speed recording; the apparatus is structurally complicated and electrical control of the droplet stream in their flying direction is highly difficult; satellite dots tend to occur readily on the recording member; and other problems.

Also, the second-mentioned system possesses the following disadvantages: because certain problems exist in working the recording head and miniaturization of a piezo-vibrating element with a desired resonance is extremely difficult, the size-reduction and multi-orifice structure of the recording head are difficult to be realized; since the droplet forming frequency is low, the system is not suitable for high speed recording; satellite dots and fogging in the recorded image occur relatively frequently; and other disadvantages.

Thus, the conventional liquid jet recording methods have fundamental defects and points for improvement with respect to its structure, high speed recording operation, manufacture of the recording head, particularly, the multi-orifice structure in high density, occurrence of satellite dots and fogging in the recorded image, and other deflects, hence the methods are limited in use only where their advantages can be exhibited.

SUMMARY OF THE INVENTION

In view of the abovementioned various problems inherent in the conventional liquid jet recording method, it is the principal object of the present invention to provide an improved liquid jet recording method which is practicable in a device of a simple construction, and which contributes to readily realize the multi-orifice structure of the recording head, particularly a high density multi-orifice structure, to effect high speed recording, and to produce a recorded image free from satellite dots and fogging.

It is another object of the present invention to provide an improved liquid jet recording method which produces a high quality, clear image with high image resolution, and which contributes to manufacture, at a low production cost, a practical recording apparatus which is extremely easy to handle and in a compact size.

According to the present invention, in one embodiment thereof, there is provided a liquid jet recording method comprising steps of:

(a) irradiating to light beam an opto-mechanical transducing means mechanically coupled with a pressure acting zone in a manner to effectively transmit a pressure generated by the beam irradiation to liquid filled in said pressure acting zone which constitutes a part of a liquid flow path having a discharge orifice to form droplet flying in a predetermined direction by ejection of the liquid, and where the pressure generated from the opto-mechanical transducer means acts on the liquid filled therein;

(b) displacing wall of said pressure acting zone by the mechanical displacement of said opto-mechanical transducing means caused by the light beam irradiation;

(c) causing abrupt pressure change to occur in the liquid filled in said pressure acting zone; and (d) ejecting the liquid from said liquid discharge orifice to form flying droplet which is directed toward the surface of a recording medium to adhere thereon for recording.

According to the present invention, in another embodiment thereof, there is provided a liquid jet recording method which comprises: irradiating with laser beam an opto-mechanical transducing means provided at a position, in a liquid flow path having a discharge orifice for ejecting liquid in a predetermined direction and a pressure acting zone, at which a pressure acts on the recording liquid filled in that portion of the flow path, where the pressure as generated is effectively transmitted to the recording liquid filled in the pressure acting zone so as to enable the liquid to be ejected from the discharge orifice, thereby causing mechanical displacement which works to inwardly deform the wall of the pressure acting zone, and thereby causing abrupt pressure change to occur in the liquid filled in the pressure acting to eject the liquid from the discharge orifice in the form of droplets which fly toward a recording member surface, on which the droplets adhere to make necessary recording.

According to the present invention, in still another embodiment thereof, there is provided a liquid jet recording apparatus comprising:

(a) a liquid jet recording head having a liquid discharge orifice for ejecting liquid, a liquid flow path with the liquid discharge orifice, a pressure acting zone constituting a part of said liquid flow path and applying a pressure to liquid filled therein, and opto-mechanical transducing means mechanically coupled with said pressure acting zone;
(b) a liquid reservoir provided so as to communicate with said pressure acting zone;
(c) a light beam oscillating means to produce a beam output to be applied onto said opto-mechanical transducing means;
(d) a light beam modulating means to modulate light beam oscillated from said liquid beam oscillating means; and
(e) an optical system to irradiate an irradiation section of said opto-mechanical transducing means with the light beam passing through said light beam modulating means.

According to the present invention, in another embodiment thereof, there is provided a liquid jet recording apparatus comprising:

(a) a liquid jet recording head having a liquid discharge orifice for ejecting liquid, a liquid flow path with the liquid discharge orifice, a pressure acting zone constituting a part of said liquid flow path and applying a pressure to liquid filled therein, and opto-mechanical transducing means mechanically coupled with said pressure acting zone;
(b) a light beam oscillating means to produce a beam output to be applied onto said opto-mechanical transducing means;
(c) an optical system to irradiate an irradiation section of said opto-mechanical transducing means with the light beam output from said light beam oscillating means; and
(d) a means for detecting a position of said flow path, and determining beam irradiating timing to irradiate said opto-mechanical transducing means with said light beam output from said light beam oscillating means.

According to the present invention, in still another embodiment thereof, there is provided a liquid jet recording head which comprises in combination:

(a) a liquid discharge orifice for ejecting liquid;
(b) a liquid flow path having the liquid discharge orifice at the distal end thereof;
(c) a pressure acting zone constituting a part of said liquid flow path, and where a pressure acts on the liquid filled therein; and
(d) an opto-mechanical transducing means mechanically coupled with said pressure acting zone.

DETAILED DESCRIPTION OF PREFERRED EMBODIMENTS

In the following, the present invention will be described in detail with reference to several preferred embodiments thereof as shown in the accompanying drawing.

Figure 1:
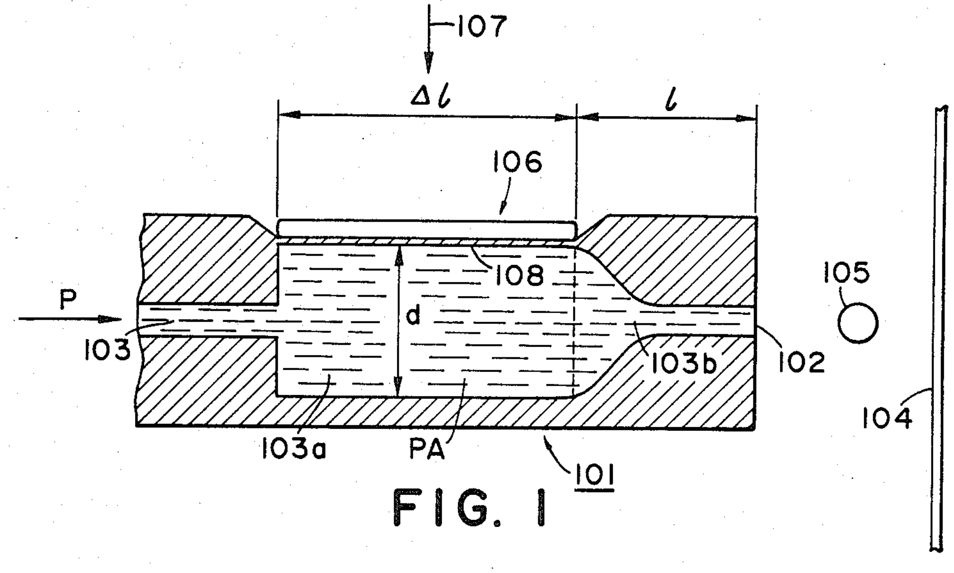
FIG. 1 is a schematic diagram for explaining the outline principle of the liquid jet recording according to the present invention.

Referring first to FIG. 1 which is a diagram for explaining the basic principle of the present invention, recording liquid 103 to be discharged from a discharge orifice 102 is fed into a nozzle 101 which is gradually tapered toward its distal end and forms a flow path to be filled with the recording liquid. The liquid 103 is under a desired pressure applied thereto through an appropriate pressure applying means such as pump, etc. so as to be dischargeable from the orifice by the pressure, or under a pressure P at a constant level that does not discharge the liquid through the discharge orifice 102. Now, when laser beam 107 is irradiated onto an opto-mechanical transducer 106 provided at a portion of the nozzle 101 with a length Δl (pressure acting zone) to transmit a pressure to the recording liquid 103*a* in the nozzle at a distance l from the discharge orifice 102, the wall 108 of the pressure acting zone Δl is inwardly displaced due to mechanical displacement of the opto-mechanical transducer means 106, and an abrupt pressure change occurs in the pressure acting zone Δl. By this pressure change, a portion or substantially entire portion of the liquid 103*b* existing in the length l of the nozzle 101 is discharged from the orifice 102, and flies in the form of droplet towards a recording member 104, and adheres at a predetermined position on its surface. The degree of the pressure change depends on energy quantity of the laser beam 107 to irradiate the opto-mechanical transducer 106.

When the laser beam irradiation is stopped, the mechanical displacing force of the opto-mechanical transducer 106 works in the direction to reinstate it to the original state, whereby the opto-mechanical transducer 106 returns to the initial state, and the subsequent laser beam irradiation is prepared.

The liquid for a portion discharged from the discharge orifice 102 is replenished in the nozzle 101 by a restitutive force to occur when the inwardly displaced wall 108 returns to its original state, or by a capillary action within the nozzle 101, or by a forced pressure, or by composite action of these forces.

Size of the droplet 105 to be formed depends on a mechanical displacement quantity of the opto-mechanical transducer 106 based on irradiation of the laser beam, a length Δl of the pressure acting zone 103*a*, and a volume of the liquid 103*a* within the pressure acting zone Δl where the liquid within the nozzle 101 receives the action from the mechanical displacement, an average inner diameter d of the nozzle 102 in the portion of the length l when it is cylindrical, an average cross-sectional area at the portion of the length l of the nozzle 102 when it is in other shape than cylindrical, a length l from the position of the discharge orifice 102 to a position where it is subjected to action of the mechanical displacement of the wall 108, a pressure P to be applied to the liquid, ratio of compression of the liquid, and viscosity and surface tension of the liquid, and so forth. Accordingly, by changing any one or more of these controllable factors, it becomes possible to readily control, as desired, the size of the droplet 105, and the perform the recording on the recording medium 104 with an arbitrary droplet diameter or spot diameter (a diameter when the droplet 105 adheres on the surface of the recording member 104).

Although, according to the present invention, the laser beam 107 to be applied to the opto-mechanical transducer 106 disposed on the pressure acting zone Δl of the nozzle 101 may be continuously irradiated, or it may be irradiated intermittently in accordance with a recording signal by pulsive on-off operation of a laser oscillator, it is preferable that, for improving the droplet forming frequency, the beam irradiation be carried out repeatedly in a non-continuous pulse form.

According to the present invention, it is possible to cause the irradiating laser beam to carry thereon recording informations by causing the mechanical displacement force from the opto-mechanical transducer 106 produced on the basis of the irradiating laser beam to act intermittently on the liquid at the pressure acting zone Δl of the nozzle 101. In more detail, by causing the mechanical displacement to take place through irradiation of the opto-mechanical transducer 106 with the laser beam 107 in accordance with recording information signals, and bringing about pressure changes in the liquid 103*a* in the pressure acting zone Δl in conformity to the recording information signals, the recording informations can be carried on any of the droplets 105 to be produced, whereby all these recording information carrying droplets can be adhered onto the recording member 104 to perform the recording operation. That is to say, the so-called "drop-on-demand" recording can be effected.

In this case, the laser beam is irradiated pulsively, and the amplitude and width of the pulse at that time can be arbitrarily selected as desired and be easily varied. As the consequence of this, the size of the droplets and the number $N_O$ of the droplets to be produced per unit time can be controlled extremely easily.

When the pressure acting zone Δl is irradiated non-continuously with the laser beam without the recording informations being carried on it, the irradiation is effected repeatedly with a certain definite frequency. The frequency in this case may be determined appropriately as desired in consideration of a kind and physical properties of the liquid to be used, shape of the nozzle, volume of the liquid at the pressure acting zone Δl, feeding rate of the liquid into the nozzle, an orifice diameter, recording speed, and so forth. A desirable frequency for the laser beam irradiation in this case usually ranges from 0.1 to 1,000 KHz, more preferably from 1 to 1,000 KHz, and optimumly from 2 to 500 KHz.

The pressure to be applied to the liquid 103 in this case may be at a level or higher where the liquid 103 is discharged from the orifice 102 when no laser beam is irradiated, or may be at a level where the liquid is not discharged. At either pressure level, a pressure change takes place in the liquid 103*a* at the pressure acting zone Δl by the inward displacement of the wall 108 caused by the laser beam irradiation and the reinstatement of the inwardly displaced wall to its original state. On the basis of repeated changes in the pressure, a stream of droplets can be formed with a desired droplet diameter and a droplet forming frequency. The droplets thus formed are controlled in accordance with the recording informations by means of, for example, charge control, electric field control, air current control, etc., whereby recording of the informations is effected.

The opto-mechanical transducer 106 may be provided in direct contact with the inner wall surface or outer wall surface of the pressure acting zone Δl of the nozzle 101, or at least the wall 108 per se of the pressure acting zone Δl of the nozzle 101 may be formed with the opto-mechanical transducer 106. In either case, the opto-mechanical transducer should be so constructed and arranged that the mechanical displacement force of the opto-mechanical transducer 106 due to the laser beam irradiation may effectively act on the liquid 103*a*.

For the nozzle forming material to construct the liquid flow path, there may be selected those materials having an appropriate distortion characteristic to enable the portion, where the opto-mechanical transducer 106 is provided, to be effectively distorted in accordance with the mechanical displacement of the opto-mechanical transducer 106, and to enable the acting force derived from the distortion to be effectively transmitted to the liquid 103*a* in the pressure acting zone Δl to cause an abrupt pressure change in the liquid 103*a*.

Also, thickness of the pressure acting zone Δl of the nozzle 101 is desirably designed so that acting force produced by the inwardly directing mechanical displacement of the opto-mechanical transducer 106 may be transmitted efficiently and effectively to the liquid 103*a* in the pressure acting zone Δl. For example, the thickness may be made as thin as possible.

In the case of using a recording head of a type constructed by providing the opto-mechanical transducer 106 on the inner wall surface of the nozzle 101, and wherein a part of the surface of the opto-mechanical transducer 106 constitutes the wall surface 108 of the pressure acting zone Δl, the nozzle forming material should be selected from those having good permeability to the irradiating laser beam.

For the material constituting the nozzle 101, there may be selected most of those materials that satisfy the abovementioned conditions, and that are not subjected to irreversible deformation by the mechanical displacement force from the opto-mechanical transducer 106 provided on the pressure acting zone Δl, but the mechanical displacement force can act efficiently on the liquid 103 within the nozzle 101. Representative examples of such materials are ceramics, glass, metals, heat-resistant plastics, and so forth. In particular, glass is considered to be one of the preferred material in view of its readiness in working, and appropriate distortion characteristic and elastic characteristic.

Photosensitive ceramics as available in general market under a tradename of "PHOTOCERUM", or photosensitive glass, or photosensitive resins may be listed as one of the preferred materials in fabricating the recording head, particularly, a high density multi-orifice recording head since these materials can be processed by etching and like methods.

The cross-sectional shape of the nozzle may be, for example, square, semi-circular, and so on, besides it is circular as in the cylindrical nozzle in case of adopting glass fiber as the nozzle forming material. In particular, in the recording head wherein the opto-mechanical transducer 106 is provided on either the outer or inner wall of the nozzle 101, the nozzle shape should preferably be such that the surface of the pressure acting zone where the opto-mechanical transducer 106 is provided be planar.

From this standpoint, in the case of the multi-orifice recording head, the required numbers of groove are formed in a plate member having good plurality by the etching process, and then a separate plate is adhered on this grooved plate member in a manner to cover the grooves, whereby an individual nozzle can be formed. Therefore, the photosensitive ceramics, or photosensitive glass, or photosensitive resins are suitable for the purpose.

The laser source for the purpose of the present invention is appropriately selected from various kinds of lasers having a desired wavelength and capable of producing a desired power depending on the kind of the recording liquid to be used, the material constituting the opto-mechanical transducer, the material quality of the portion of the pressure acting zone which is irradiated with the laser beam, and so forth.

The lasers which are effectively adopted in the present invention are as follows: a solid state laser such as $CaWO_4$ laser doped with $Nd^{3+}$, YAG laser, glass laser, etc.; an inorganic liquid laser prepared by dissolving $Nd_2O_3$ or $NdCl_3$ into $SeOCl_2$ and $POCl_2$ and put in a rod-shaped container for use; a pigment laser such as ethanol or methanol solution of phthalocyanine pigment, Rhodamin pigment, etc.; a gas laser such as He-Xe laser, He-Ne laser, Ar ion laser, $N_2$ laser, $CO_2$ laser, $H_2O$ laser, HCN laser, etc.; and a semiconductor laser such as p-n junction type GaAs laser, CdSe laser, CdS laser, $Cd_3P_2$ laser, InSb laser, etc.

Of these lasers, an infrared ray laser having an oscillating wavelength within the infrared region is particularly suitable for the purpose of the present invention because of its matching with the opto-mechanical transducer, as will be explained later.

The opto-mechanical transducer 106 which characterizes the liquid jet recording method according to the present invention brings about the mechanical displacement by the laser beam irradiation, and induces the action of inwardly displacing the wall surface 108 of the pressure acting zone. The transducer is designed in its construction and selected in its constituent material such that it may bring about distortional phenomenon by expansion and contraction due to the laser beam irradiation.

The opto-mechanical transducer according to the present invention may either absorb energy of the laser beam upon its irradiation and directly bring about the mechanical displacement, or absorb the laser beam energy, generate heat, and bring about the mechanical displacement by the action of the heat.

In more detail, in the case of the former, the opto-mechanical transducer is of the direct transducing type, while in the case of the latter, it is of the indirect transducing type through heat conversion. Any of these two types may be adopted for the opto-mechanical transducer of the present invention.

In order that the opto-mechanical transducer may efficiently bring about the mechanical displacement by the laser beam irradiation, its structure should be determined so that the material having good efficiency of its volume expansion, linear expansion, volume contraction, or linear contraction due to the laser beam irradiation, is used to obtain a desired distortion characteristic. For example, it may be formed in such a construction that two materials having mutually different expansion or shrinkage coefficient are laminated into layers and any one of the laminated layers is distorted by its expansion or shrinkage upon the laser beam irradiation, or it may be formed in such a manner that one material is formed into a layer or plate structure having a certain degree of thickness, and this layer or plate is made to absorb the laser beam at its surface portion alone and to be distorted, whereby the transducer becomes able to distort toward one surface side alone.

Figure 2A:
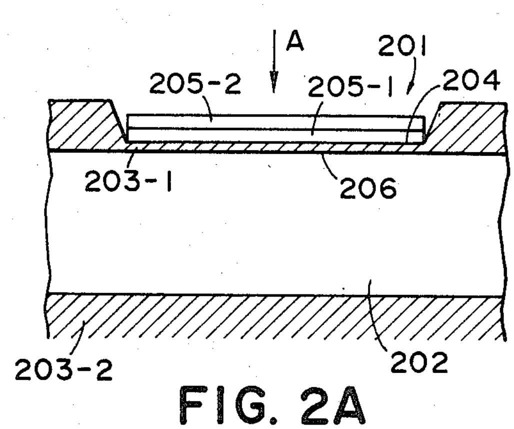
FIGS. 2A and 2B are fragmentary cross-sectional views for explaining the construction of the opto-mechanical transducer used in the liquid jet recording apparatus according to the present invention.
Figure 2B:
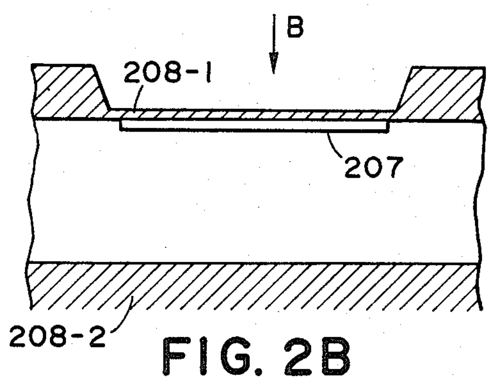

FIGS. 2A and 2B are fragmentary schematic cross-sectional views of the opto-mechanical transducer according to the present invention for explaining its structure and operation. In FIG. 2A, the opto-mechanical transducer 201 is provided in good mechanical contact with the outer wall surface 204 of the liquid flow path forming member 203 which forms a discharge orifice (not shown) for ejecting the recording liquid and a flow path having in its one part the pressure acting zone 202 communicating with the discharge orifice.

A portion 203-1 constituting the outer wall surface 204 of the flow path forming member 203 is given an appropriate distortion characteristic and an elastic characteristic so as to effectively transmit to the liquid in the pressure acting zone 202 a force tending to distort the opto-mechanical transducer 201 toward the pressure acting zone 202 when it receives the laser beam irradiation, and to cause change in the liquid to increase its internal pressure. For this purpose, the portion 203-1 shold desirably be made as thin as possible to such an extent that a desired mechanical strength can be maintained.

The opto-mechanical transducer 201 as shown in FIG. 2A is so constructed that two kinds of materials having mutually different expansion or shrinkage coefficient are laminated in the form of layers on the surface of the portion 203-1 to provide an appropriate distortional characteristic due to optical action or an appropriate distortional characteristics due to thermal action. For example, in case the laser beam irradiation is carried out from the side shown by an arrow A, the materials to form a first layer 205-1 and a second layer 205-2 are selected so as to satisfy a relationship of $\theta_2<\theta_1$, or preferably $\theta_2<<\theta_1$, where $\theta_1$ represents a thermal expansion coefficient of the material forming the first layer 205-1 provided on the side of the outer wall surface 204, and $\theta_2$ refers to a thermal expansion coefficient of the material forming the second layer 205-2 to be laminated on the first layer 205-1. In this case, when a difference between the thermal expansion coefficients $\theta_1$ and $\theta_2$ is to be made the best use of, the material for the first layer 205-1 is selected from those having good absorption with respect to the laser beam, while the material for the second layer 205-2 is selected from those having good permeability.

When the opto-mechanical transducer 201 is constructed so as to satisfy the relationship of $\theta_2<\theta_1$ between the first and second layers as mentioned above, the first layer 205-1, upon the laser beam irradiation, absorbs it and thermally expands, whereby the opto-mechanical transducer 201 distorts in convex shape to the side of the pressure acting zone 202. With this distortion, the inner wall surface 206 of the pressure acting zone 202 displaces inwardly, i.e., it distorts toward the interior of the pressure acting zone 202 whereupon the volume of the pressure acting zone 202 abruptly reduces. On account of this, the liquid in the pressure acting zone 202 abruptly increases its internal pressure, and, by this pressure change in the liquid, the liquid is ejected from the discharge orifice in the form of flying droplet.

When the laser beam irradiation stops, and the temperature of the first layer 205-1 lowers, the layer shrinks to its original state, the inwardly deformed opto-mechanical transducer 202 also returns to its original state, and the internal pressure of the liquid in the pressure acting zone 202 also reinstates the static condition. By such operation of the opto-mechanical transducer 201, the liquid is ejected from the discharge orifice formed at the distal end of the recording head in a manner to be communicative with the pressure acting zone 202, whereby the flying droplets are formed.

On the other hand, in the structure as shown in FIG. 2A, wherein the relationship of $\theta_1<\theta_2$ (or $\theta_1<\theta_2$) is satisfied, and at least the second layer absorbs more quantity of the laser beam in practice, the opto-mechanical transducer 201 is first distorted outward when it receives the laser beam irradiation. On account of this, the volume of the pressure acting zone 202 abruptly augments, whereby the internal pressure of the liquid in this pressure acting zone 202 lowers. Next, when the laser beam irradiation to the opto-mechanical transducer 201 is interrupted, the opto-mechanical transducer 201 which has been distorted outwardly returns to its original state, whereby the inner wall surface 206 is distorted toward the pressure acting zone 202 and the volume of this zone 202 also returns abruptly to its original one. On account of this, there takes place a pressure change such that the internal pressure of the liquid in the pressure acting zone 202 abruptly increases. By this operation of the opto-mechanical transducer 201, the liquid is ejected from the discharge orifice in the form of flying droplets.

The embodiment shown in FIG. 2B provides the opto-mechanical transducer 207 on the inner wall surface of a portion 208-1 of the flow path forming member 208. In this embodiment, too, the portion 208-1should have the same characteristics as the portion 203-1 in the embodiment of FIG. 2A, hence the same material as used for the portion 203-1 is selected and formed into the same shape.

In the embodiment of FIG. 2B, the opto-mechanical transducer 207, unlike the embodiment in FIG. 2A, is of a single layer structure, and the material for the opto-mechanical transducer 207 is selected so that it may have a thermal expansion coefficient greater than that of the portion 208-1. It is also preferable that the portion 208-1 be constructed with a material permeable to the irradiating laser beam so that the irradiating laser beam shown by an arrow B may be efficiently absorbed into the opto-mechanical transducer 207. It is further preferable for the purpose of the present invention that a thin film which causes the opto-mechanical transducer to absorb the laser beam and generate heat be provided to augment the efficiency of absorbing the laser beam. In this case, since the opto-mechanical transducer can be designed in such a structure that the laser beam absorbing the heatgenerating function and the thermal distortion function thereof may be separated, a range of selection of the material is conveniently broadened.

Various combinations of materials to constitute the opto-mechanical transducer having the structure as shown in FIG. 2A can be contemplated, of which the following representative examples may be enumerated: brass (Zn 30–40%)/Ni steel (Ni 34%); brass (Zn 30–40%)/invar (Ni 36%); monel metal (Ni-Cu)/Ni steel (Ni 34–42%); Ni steel (Ni 20%)/Ni steel (Ni 42–52%); etc.

For the material constituting the opto-mechanical transducer of a construction shown in FIG. 2B, there may preferably be used those among the above-listed materials having a large thermal expansion coefficient.

The opto-mechanical transducer according to the present invention can be given more effective mechanical displacement by utilizing the distortional phenomenon by the structural change of the material constituting the transducer at the Curie point.

Figure 3:
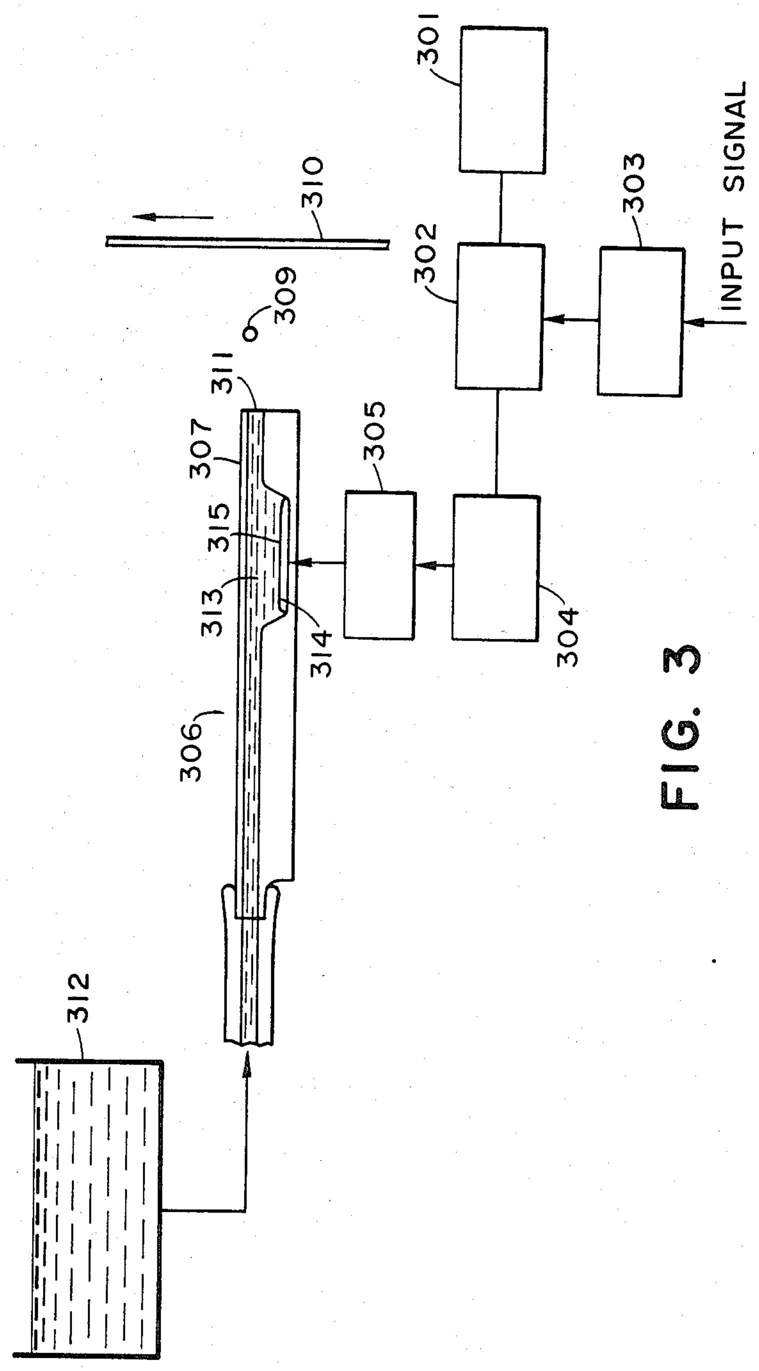
FIG. 3 is a schematic diagram showing a construction of a preferred embodiment of the liquid jet recording device to practice the recording method of the present invention.

FIG. 3 shows a schematic diagram of a preferred construction of the liquid jet recording apparatus to practice the method of this invention.

In the drawing, the laser beam oscillated from a laser beam oscillator 301 is pulse-modulated in a beam modulator 302 in accordance with a recording information signal which has been input into a beam modulator driving circuit 303 and output after it is subjected to electrical processing. The pulse-modulated laser beam passes through a scanner 304, and is so converged by a beam converging lens 305 that it may be focused on a predetermined position on the opto-mechanical transducer 314 provided at the pressure acting zone 313 defined at one portion of the flow path forming the nozzle 307 which is one of the elements constituting the recording head 306. The portion of the opto-mechanical transducer 314 which has been irradiated with the laser beam absorbs the laser beam to be directly distorted, or absorbs the laser beam to generate heat and is distorted by the heat to cause the surface forming the wall 315 of the pressure acting zone 313 of the opto-mechanical transducer 314 to be displaced inwardly of the pressure acting zone 313, and to cause the volume of the pressure acting zone 313 to abruptly decrease and the liquid in the pressure acting zone 313 to be abruptly compressed. The liquid in the pressure acting zone 313 which has been subjected to force of action produced by the abrupt inward displacement of the wall surface 315 increases its internal pressure, and transmit the pressure change to the liquid preceding the same to the side of the discharge orifice 311. As the consequence of this, the liquid is ejected from the discharge orifice 311.

When the wall surface 315 which has been inwardly displaced by the distortion of the opto-mechanical transducer 314 begins to reinstate its original state, the pressure acting zone 313 begins to increase so as to reinstate its original volume, and the internal pressure of the liquid in the pressure acting zone 313 decreases. As the result of this, a part of the liquid which has been pushed away to the side of the discharge orifice 311 is drawn back toward the pressure acting zone 313. In this manner, the flying droplets 309 are formed, which are adhered onto the surface of the recording member 310 for the recording.

The remarkable characteristic of the embodiment shown in FIG. 3 is that, by arbitrarily changing the irradiating quantity or energy of the laser beam, the size of the droplet 309 of the recording liquid to be discharged from the discharge orifice 311 can be controlled, hence the density of the image to be formed on the recording member 310 can be arbitrarily adjusted.

Besides the above, since the laser beam can be acted on the opto-mechanical transducer 314 in a non-contact manner, the recording head 306 can be made extremely simple in construction and manufactured at a very low cost. Therefore, when the recording head 306 is to be made in a high density multi-orifice structure, these advantages can be exhibited at its maximum.

In case of using this multi-orifice recording head, a force produced by the mechanical displacement can be caused to act on the recording liquid in each of the nozzles only by applying the laser beam to the opto-mechanical transducer provided on each of the nozzles arranged in a plurality of numbers, without providing a complicated electrical circuit on each of the nozzles of the recording head, which greatly contributes to maintenance of the recording head.

For the beam modulator 302, there may be used most of those beam modulators which are generally used in the field of the laser beam recording. In the case of the high speed recording, however, an acousto-optical modulator (AOM) and an electro-optical modulator (EOM) are particularly effective. There are two systems of using these modulators: the one is an external beam modulating system wherein the modulator is disposed outside the laser resonator; and the other is an internal modulating system wherein the modulator is disposed inside the laser resonator. Both these systems may be adopted for the purpose of the present invention.

The scanner 304 is classified into a mechanical type and an electronic type. Any suitable system may be adopted depending on the recording speed. The mechanical scanner includes a galvanometer; an electric distortion element and a magnetic distortion element which are interlocked with a mirror; and a high speed motor which is interlocked with a mirror (rotatory polygonal mirror), a lens, or a hologram. The former is suitable for a low speed recording, and the latter for a high speed recording. The electronic scanner includes an acousto-optical element, an electro-optical element, a photo-IC element, and so forth.

Figure 4A:
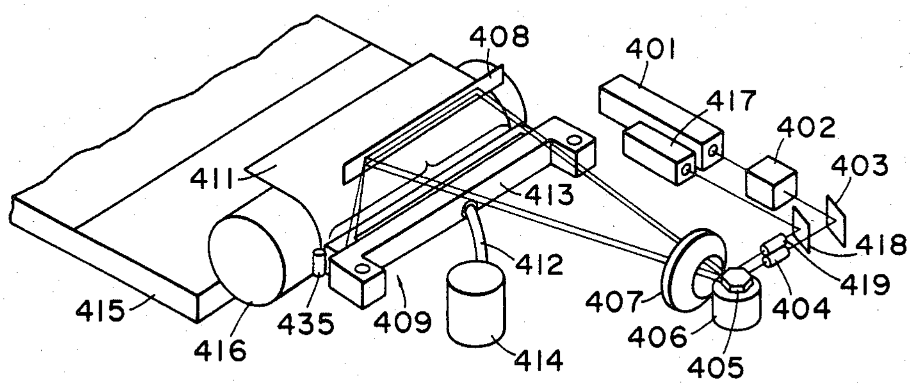
FIG. 4A is a schematic perspective view of explaining another preferred embodiment of the apparatus according to the present invention.
Figure 4B:
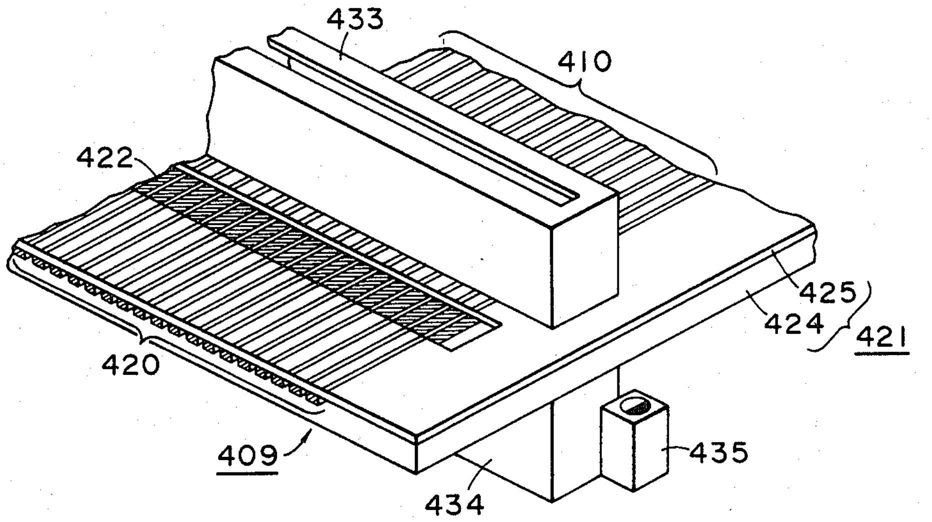
FIG. 4B is a schematic, fragmentary perspective view of the recording head used in the device shown in FIG. 4A.

FIGS. 4A and 4B are schematic perspective views for explaining other preferred embodiment of the device to practice the liquid jet recording method according to the present invention.

In the drawing, a first laser beam oscillated from a first laser oscillator 401 is led to an entrance opening of the acousto-optical modulator 402. In the modulator 402, the first laser beam is subjected to modulation, either strong or weak in accordance with input signals of recording informations into the modulator 402. The modulated first laser beam is bent its light path by a reflecting mirror 403 toward a beam expander 404 to enter thereinto. The modulated first laser beam is expanded its beam diameter in this beam expander 404 in its collimated state. Subsequently, the first laser beam with its beam diameter having been expanded is projected onto a polygonal mirror 405. The polygonal mirror is so constructed that it is mounted on a rotational shaft of a hysteresis synchronous motor 406 and rotated at a constant speed. The first laser beam which is horizontally scanned by the polygonal mirror 405 is focused by an f-$\theta$ of lens 407 on a predetermined position of each flow path of a train of the liquid flow paths arranged in array at the distal end of the full-line, high-density multi-orifice recording head 409 (i.e., on the opto-mechanical transducer 428 provided on the pressure acting zone). By focusing the first laser beam on each opto-mechanical transducer 428, the transducer becomes actuated, and the recording liquid in each flow path is subjected to force produced by the pressure change, whereby the recording liquid is discharged from the orifice of each flow path in the form of flying droplets, and the recording is thus done on the recording member 411. Into each of the flow paths of the recording head 409, the recording liquid is supplied from a liquid reservoir 414 through a liquid feeding pipe 412 and a common liquid chamber provided inside a common liquid chamber member 413.

In the drawing, the recording member 411 is in a sheet form and is fed by a sheet feeding means (not shown), which is usually adopted in the field of the recording device, in synchronism with recording signals, from a paper feeding cassette 415 where a multitude of recording members 411 are stacked.

A second laser beam oscillated from a second laser oscillator 417 is directed its light path by a reflecting mirror 418 toward a beam expander 419, after which it is irradiated onto each flow path of the recording head 409 through the polygonal mirror 405, the f-$\theta$ lens 407, the reflecting mirror 408, as is the case with the first laser beam. The second laser beam scans and irradiates the flow path train with an energy not reaching a sufficient level to cause the recording liquid to be discharged.

Figure 4C:
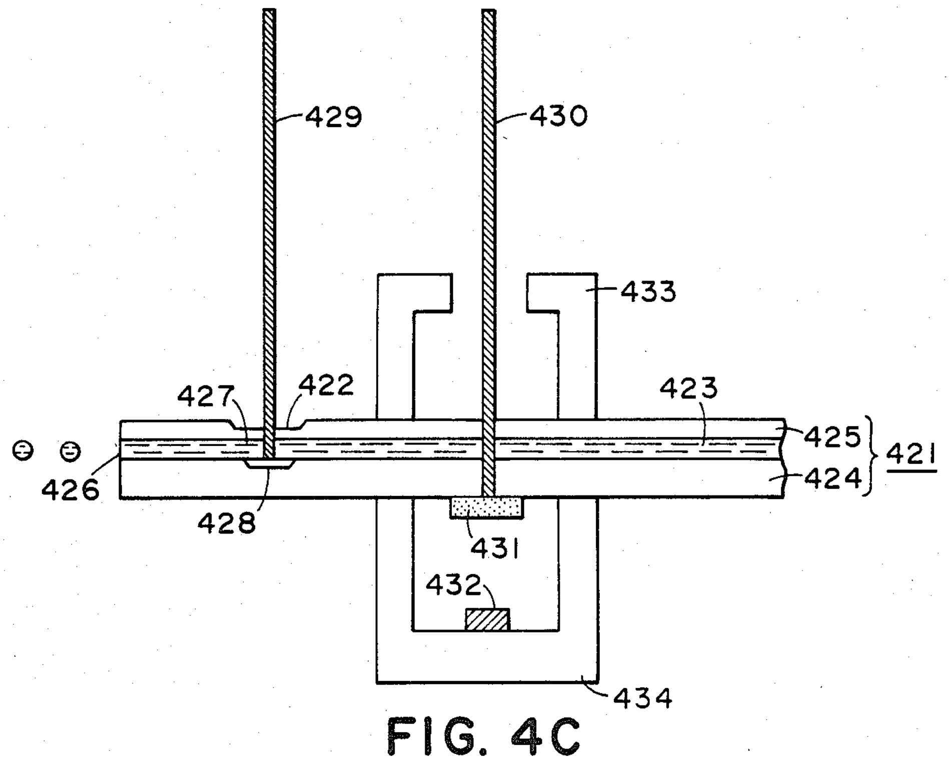
FIG. 4C is a schematic cross-sectional view of the recording head shown in FIG. 4B.

FIG. 4B illustrates a schematic fragmentary perspective view of the recording head 409 used in the recording device of FIG. 4A as viewed from the side of the discharge orifice, and FIG. 4C shows a longitudinal cross-section of the recording head. The distal end of the recording head 409 has 4,800 nozzles 420 arranged in a rectilinear array over a total length of 300 mm with an orifice density of 16 orifices/mm. On the top surface of the nozzle train member 421 where the nozzle train 420 is formed, an irradiating section 422 permeable to the laser beam is defined in such a manner that the laser beam may be converged and irradiated on a predetermined position of the opto-mechanical transducer 428 provided on each of the nozzle in the nozzle train 420. Each nozzle of the nozzle train 420 forms a liquid flow path 423. The liquid flow paths are mutually parallel and isolated in the nozzle train member 421. From the orifice 426 of each nozzle 420, droplets are discharged and flown toward the surface of the recording member 411 every time the laser beam is irradiated on a portion corresponding to the irradiating section 422 of each nozzle 420. Each of the liquid flow paths 423 is communicative with the common liquid chamber provided inside the common liquid chamber member 413. The liquid flow path is determined in such a structure and a size that the liquid may be smoothly fed into the nozzle 420 from the common liquid chamber, depending on necessity. In order that the nozzle 420 may be provided in predetermined numbers and with a desired pitch, the nozzle train member 421 is so constructed that the groove to form the liquid flow path 423 comprises a grooved plate 424, in which the grooves are formed by the etching method in correspondence to numbers of the nozzle to be formed, and a groove cover 425 having an irradiating surface 422 to enable the laser beam to be irradiated onto each opto-mechanical transducer 428 on the nozzle 420. The grooved plate 424 and the groove cover 425 are precisely joined together with an appropriate adhesive being used. The structure of the nozzle 420 is shown in FIG. 4C in cross-section.

On the top part of the pressure acting zone 427 defined at a predetermined position on the upstream side of the orifice 426, there are provided the laser beam irradiating section 422 and the opto-mechanical transducer 428 with given size, structure, and material so that the laser beam may be efficiently irradiated on the opto-mechanical transducer 428 and that a pressure change to occur by the beam irradiation may be transmitted efficiently to the recording liquid in the pressure acting zone 427.

In the nozzle construction as shown in FIG. 4C, grooves are formed in one part of the groove cover 425 by means of etching, mechanical cutting, and other methods to render the wall thickness thin, a material having good permeability to the laser beam is selected for the groove cover, and a reflection-preventive coating is applied on the cover surface. Further, at a portion constituting the top surface part of the pressure acting zone 427, there is disposed the opto-mechanical transducer 428 which absorbs the laser beam, generates heat as the case may be, and has a function of causing the pressure change to occur in the liquid in the pressure acting zone 427 by the inward distortional displacement of the pressure acting zone 427.

Now, when the first laser beam 429 is irradiated in such a manner that it may be converged on the opto-mechanical transducer 428 through the irradiating section 422, this opto-mechanical transducer 428 absorbs the laser beam and generates heat, depending on the case, to be inwardly deformed at its pressure acting zone 427, and the pressure caused by this deformation acts on the liquid in the pressure acting zone 427. The liquid subjected to the pressure action brings about abrupt pressure change in its interior, and the liquid to the side of the orifice 426 is rapidly pushed away forward the orifice 426 by the acting force from the pressure change, whereby the droplets are discharged from the discharge orifice 426 and fly toward the recording member.

Although, in the nozzle construction shown in FIG. 4C, the groove cover 425 and the irradiating section 422 are made of the same material, it may be feasible that a different material from that of the groove cover 425 is used for the irradiating section 422 so as to satisfy the characteristic and function required of the irradiating section 422. However, from the standpoint of readiness in manufacture, low manufacturing cost, etc., they should preferably be made in an integral structure as shown in the drawing. The opto-mechanical transducer 428 may be provided on the side opposite to the irradiating section 422, i.e., on the side of the groove plate 424 as shown in the drawing. When the irradiating section 422 per se is constituted with the opto-mechanical transducer, the energy loss of the laser beam at the irradiating section 422 can be eliminated more remarkably, hence it is more convenient.

In FIG. 4C, the second laser beam 430 irradiates the diffusion plate 431, while it is being scanned in the same manner as the case of the first laser beam 429. However, when the second laser beam passes through the liquid flow path 423, it is intercepted totally, or absorbed in part, by the liquid. Therefore, the light pattern on the diffusion plate 431 corresponds to a pattern formed by projecting the flow path 423. The patterns are sequentially detected by a photo-detector 432, with which detection signal the irradiating timing of the first laser beam is controlled. Reference numerals 433 and 434 designate shield plates for preventing external reverse light from entering.

In FIGS. 4A and 4B, a numeral 435 designates a start detector for detecting a scanning start position of the second laser beam 430.

When the second laser beam 430 is detected by the start detector 435, the commencement of the scanning operation is ascertained. Thereafter, irradiation with the first laser beam 429 is carried out with a timing of a signal to be detected by the photo-detector 432 when the liquid flow path 423 is irradiated by the second laser beam.

So far, explanations have been made with reference to embodiments of the present invention as illustrated in FIGS. 4A to 4C. It is to be noted that the invention is not limited to these embodiments alone, but various other modifications may be made. For instance, the second laser beam may be split out of the laser oscillator for the first laser beam with a beam splitter, etc. Further, in the above-described embodiments, the liquid flow paths irradiated by the second laser beam are detected using a laser beam permeating type detector. It is, of course, possible to effect the detection with a light reflection type detector.

Figure 5:
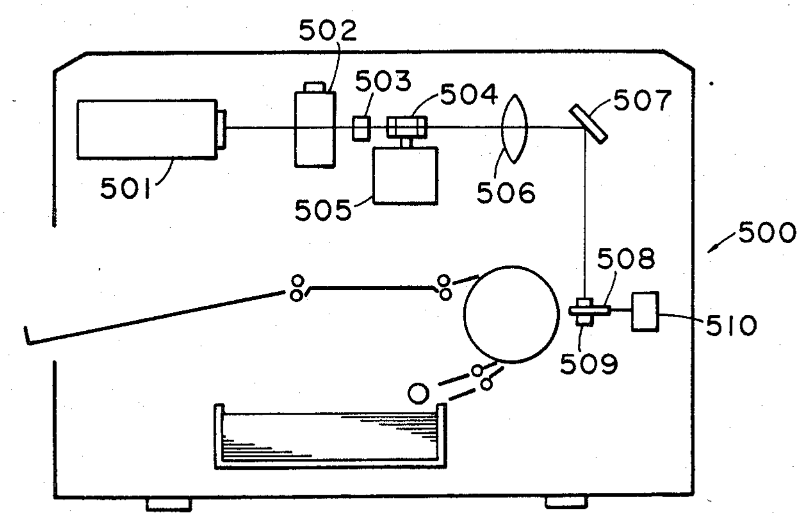
FIG. 5 is a schematic view for explaining still another embodiment of the apparatus according to the present invention.

FIG. 5 is a schematic explanatory diagram, wherein the device of the present invention is used as a computer output device 500 using the recording head shown in FIG. 4B. The laser beam oscillated from the laser oscillator 501 is modulated by the modulator 502, either strong or weak in accordance with external signals. For the modulator 502, there is used an acousto-optical transducing element utilizing the well known acousto-optical effect, or an electro-optical element utilizing the electro-optical effect. When the laser oscillator 501 is of a semiconductor laser, or when a gas laser, etc. is used for a laser oscillator of a type capable of performing current modulation, or a laser oscillator of an internal modulation type, wherein the modulating element is incorporated in the oscillating light path, the modulator 502 can be dispensed with, and the laser beam is directly guided to the beam expander 503.

The laser beam from the modulator 502 is enlarged in its beam diameter by the beam expander 503 in its collimated state. Further, the laser beam with its beam diameter having been expanded is introduced into a rotatory polygonal mirror 504 having one or a plurality of mirror faces. The laser beam which is horizontally scanned by the rotatory polygonal mirror 504 mounted on a shaft supported by a high precision bearing (e.g., a pneumatic bearing) and driven by a motor 505 rotating at a constant speed (e.g., a hysteresis synchronous motor, d.c. servo-motor) is focused on the irradiating surface of the opto-mechanical transducer of the recording head 508 by an image forming lens 506 having the f-$\theta$ characteristic through a beam irradiating position adjusting mirror 507. The position of the laser beam is detected by the light detector 509 provided at the end part of the recording head 508, and the laser beam is modulated and applied in synchronism with each of the nozzles in the recording head 508, thereby discharging the recording droplets.

The recording sheets 511 stacked in a paper feeding cassette 510 is led to rotating rollers 514 for recording by way of a pick-up roller 512 and a paper feeding guide 513. The recorded paper is discharged into a paper discharge tray 518 through paper discharging rollers 515, paper discharging guide 516, and paper discharging rollers 517.

When the continuous recording operations are effected using the device of FIG. 5 and under the following conditions, extremely clear image of high quality can be obtained at any stage of the recording operation.

Orifice density: 16 per milimeter

YAG laser power: 50 W

Auxiliary scanning speed: 33.3 mm/sec.

Recording speed: 6.3 sec./A-4 size

The liquid jet recording method according to the present invention, as has been described in detail with reference to the preferred embodiments thereof, has various characteristics such that, since the high density multi-orifice recording method can be readily realized, high speed recording becomes feasible; since not only a clear and good quality recorded image free from fogging is obtained, but also a quantity of the recording liquid to be discharged and a size of the droplet can be arbitrarily controlled by regulating a quantity of the irradiating laser beam per unit time, there can be obtained an image having arbitrary gradation; since the recording apparatus to practice the recording method is extremely simple in construction, very fine processing can be done easily, on account of which the recording head per se which constitutes the principal element of the recording apparatus can be made very small in size in comparison with the conventional recording head; due to simplicity in construction of the recording head and readiness in the processing, the high density multi-orifice structure indispensable for the high speed recording operation can be realized extremely easily; in addition, in the multi-orifice recording head, the arrayed structure of the discharge orifices in the recording head can be arbitrarily designed as desired, hence it can be achieved with extreme readiness to elongate the recording head in a full-line construction, wherein the head is rendered sufficiently long to cover the whole breadth of the surface of the recording member in A-4 size, for example.

What we claim is:

1. A liquid jet recording method comprising the steps of:

(a) irradiating with a light beam an opto-mechanical transducing means mechanically coupled to a pressure acting zone of a liquid flow path to transmit a pressure generated by the irradiation of said light beam to liquid in said pressure acting zone, said liquid flow path having a discharge orifice to form a droplet flying in a predetermined direction by ejection of the liquid, when the pressure generated from said opto-mechanical transducer means acts on the liquid in said pressure acting zone;

(b) displacing a wall of said pressure acting zone by a mechanical displacement of said opto-mechanical transducing means caused by said light beam irradiation;

(c) causing an abrupt pressure change to occur in the liquid in said pressure acting zone; and (d) ejecting the liquid from said liquid discharge orifice to form the flying droplet which is directed towards a recording medium to adhere thereon for recording.

2. The liquid jet recording method as set forth in claim 1, wherein the wall of said pressure acting zone is displaced in a direction towards the interior of said pressure acting zone thereby exerting pressure on the liquid therein.

3. The liquid jet recording method as set forth in claim 1, wherein said light beam is laser beam.

4. The liquid jet recording method as set forth in claim 1, wherein said liquid flow path is provided with a plurality of flow paths.

5. The liquid jet recording method as set forth in claim 1, wherein said discharge orifice is provided at the distal end of said liquid flow path.

6. A liquid jet recording apparatus, comprising:

(a) a liquid jet recording head including a liquid flow path having a liquid discharge orifice for ejecting liquid, a portion of said liquid flow path being a pressure acting zone for applying pressure to liquid in said liquid flow path, and opto-mechanical transducing means mechanically coupled to a wall of said pressure acting zone for displacing said wall to produce pressure on liquid in said pressure acting zone;

(b) a liquid reservoir being provided in communication with said pressure acting zone;

(c) a light beam oscillating means for producing a light beam output which is applied onto said opto-mechanical transducing means;

(d) a light beam modulating means for modulating the light beam oscillated from said light beam oscillating means; and (e) an optical system for irradiating an irradiation section of said opto-mechanical transducing means with the light beam passing through said light beam modulating means to cause said opto-mechanical transducing means to produce pressure on liquid in said pressure acting zone.

7. The liquid jet recording apparatus as set forth in claim 6, wherein said liquid flow path is provided with a plurality of flow paths.

8. The liquid jet recording apparatus as set forth in claim 6, wherein said light beam oscillating means is a laser beam oscillating means.

9. The liquid jet recording apparatus as set forth in claim 6, wherein said optical system has a light converging characteristic.

10. The liquid jet recording apparatus as set forth in claim 6, wherein said optical system has the f-$\theta$ characteristic.

11. The liquid jet recording apparatus as set forth in claim 6, wherein said discharge orifice is provided at the distal end of said liquid flow path.

12. A liquid jet recording apparatus, comprising:

(a) a liquid jet recording head including a liquid flow path having a liquid discharge orifice for ejecting liquid, a portion of said liquid flow path being a pressure acting zone for applying pressure to liquid in said liquid flow path, and opto-mechanical transducing means mechanically coupled to a wall of said pressure acting zone for displacing said wall to produce pressure on liquid in said pressure acting zone;

(b) a light beam oscillating means for producing a light beam output which is applied onto said opto-mechanical transducing means;

(c) an optical system for irradiating an irradiation section of said opto-mechanical transducing means with the light beam from said light beam oscillating means to cause said opto-mechanical transducing means to produce pressure on liquid in said pressure acting zone; and (d) means for detecting the position of said opto-mechanical transducing means relative to said liquid flow path, and for determining an amount of time to irradiate said opto-mechanical transducing means with said light beam from said light beam oscillating means.

13. The liquid jet recording apparatus as set forth in claim 12, wherein said discharge orifice is provided at the distal end of said liquid flow path.

* * * * *

UNITED STATES PATENT AND TRADEMARK OFFICE

CERTIFICATE OF CORRECTION

PATENT NO. : 4,531,138

DATED : July 23, 1985

INVENTOR(S) : Ichiro Endo, et al.

It is certified that error appears in the above-identified patent and that said Letters Patent is hereby corrected as shown below:

Column 2, line 28, "to" should read -- with --;
line 29, "with" should read -- to --.

Signed and Sealed this

*Tenth* Day of *June 1986*

[SEAL]

*Attest:*

DONALD J. QUIGG

*Attesting Officer*

*Commissioner of Patents and Trademarks*